United States Patent [19]

Newman et al.

[11] 4,397,023
[45] Aug. 2, 1983

[54] HIGH EFFICIENCY DYE LASER

[75] Inventors: Leon A. Newman, South Windsor; William W. Morey, West Hartford, both of Conn.

[73] Assignee: United Technologies Corporation, Hartford, Conn.

[21] Appl. No.: 317,678

[22] Filed: Nov. 2, 1981

[51] Int. Cl.³ .............................................. H01S 3/091
[52] U.S. Cl. ........................................ 372/70; 372/53; 372/69; 372/72
[58] Field of Search ....................... 372/53, 51, 66, 72, 372/57, 82, 69-71, 81

[56] References Cited

U.S. PATENT DOCUMENTS 4,284,962  8/1981  Esterowitz et al. ................ 372/57

OTHER PUBLICATIONS

"Photolytic Pumping of the Iodine Laser by XeBr"; Swingte et al., Appl. Phys. Lett. vol. 28, No. 7, Apr 1, 1976.

Primary Examiner—William L. Sikes
Assistant Examiner—Léon Scott
Attorney, Agent, or Firm—Eric W. Petraske

[57] ABSTRACT

A long rare-gas halide excimer light source excited by a capacitively coupled discharge pumps a dye laser with high efficiency in a configuration matched to the length of the discharge.

3 Claims, 4 Drawing Figures 4,397,023

HIGH EFFICIENCY DYE LASER

TECHNICAL FIELD

The field of the invention is optically pumped dye lasers.

BACKGROUND ART

An article by B. Godard and O. deWitte in Optics Communications, Vol. 19, No. 3, 1976, discloses the use of a krypton fluoride laser to pump a dye laser. The overall efficiency of the dye laser is less than 0.1%, in part because of the wall plug efficiency of the krypton fluoride laser of 0.5%.

A German Pat. No. 2646-692 discloses a dye laser pumped by a pair of conventional flashlamps disposed symmetrically on either side of a channel through which the laser dye flows and surrounded by a pair of elliptical reflectors.

Copending application Ser. No. 286,225, assigned to the assignee of this invention, discloses a xenon chloride laser having a capillary discharge which is capacitively coupled.

DISCLOSURE OF INVENTION

The invention relates to a high efficiency dye laser in which a filamentary discharge light source is energized by capacitive coupling, one electrode of the capacitive coupling means being a reflective element which reflects light from the filamentary discharge into a dye gain medium the size of which is matched to the size of the light source, thereby producing high overall efficiency from the combination of efficient, relatively narrow band light generation and efficient coupling of the light to the gain medium.

BEST MODE FOR CARRYING OUT THE INVENTION

Figure 1:
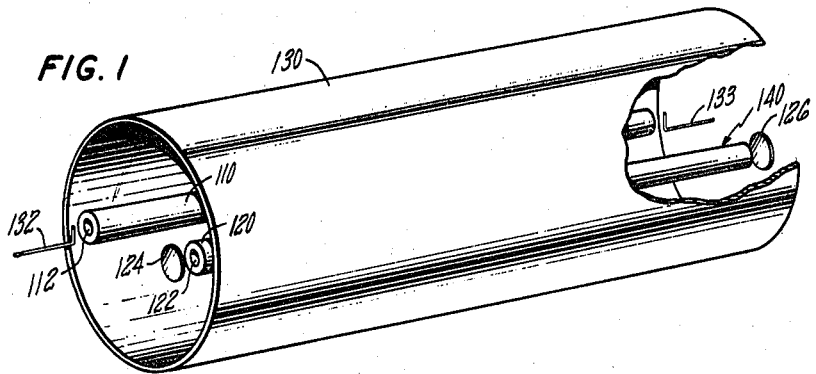
FIG. 1 illustrates an embodiment of the invention.

In FIG. 1, dye laser 140 comprising mirror 124 and mirror 126 bracketing glass tube 120 having a bore 122, bore 122 containing a dye gain medium which flows through it through tubes and by means of a conventional pumping means not shown, is pumped by a flashlamp formed by discharge tube 110 having a bore 112, tube 110 being bracketed by electrodes 132 and 133 which are connected to ground and electrode 130 which forms a reflective surface about the dye laser and the flash tube. The flashlamp is energized by conventional circuits not shown, with capacitive coupling between electrode 130 and electrodes 132 and 133 so that the medium, illustratively a xenon chloride mixture, generates light in the ultraviolet and/or visible region suited for pumping dye lasers, a characteristic of which light is that it produces intense illumination over a relatively narrow band with high efficiency. Prior art excimer lasers or rare-gas halide lasers as known in the prior art have a wall plug efficiency of typically 0.5%, so that even if the absorbing band of the dye gain medium is well matched to the line output of the exciting laser, the overall system efficiency is very small, typical examples in the prior art being on the order of 0.1%. The subject invention rests upon the high fluorescence efficiency with which excimer rare-gas halide mixtures form a relatively narrow band of light suited for pumping a dye laser. Conventional optically pumped dye lasers, of course, have flashlamps that produce broadband light so that most of the light entering the gain medium is not of the proper frequency to excite the lasing transition in the dye and therefore serves only to heat the dye fluid. The embodiment of the invention in FIG. 1 is shown as having a relatively large spacing between the flashlamp and the dye laser and between the flashlamp and the electrode 130, for purposes of clarity in disclosing the invention. In actual practice, the lamp, laser and electrode combination will be made as compact as is feasible, for maximum efficiency in capacitive coupling of the discharge and maximum efficiency in coupling the light into the gain medium. The use of capacitive coupling to excite a rare-gas halide laser is disclosed in copending application Ser. No. 286,225, referred to above.

In one embodiment of the invention, a xenon fluoride excimer mixture was used as the flashlamp medium, positioned in a 20 centimeter long tube having a bore diameter of 1 millimeter. Pulsing this lamp by means of the capacitive coupling technique disclosed in the copending application produced a total energy output in the lamp of 750 microjoules in a total peak output power of 18.75 kilowatts with a peak pump power density in the gas medium of 118 kilowatts per cubic centimeter. The gaseous medium was 200 Torr of a mixture of helium, xenon and $NF_3$ in the ratios 95:4:1. The light output was peaked within a range of 340 to 360 nanometers and the overall lamp efficiency was $14 \pm 2\%$. The achievement of power densities of 100 kilowatts per cubic centimeter in a 10 nanometer bandwidth with an overall 15% fluorescence efficiency is a substantial improvement over prior art flashlamps and doubtless can be further improved by detailed optimization. In contrast, the prior art flashlamps produce a pulse of approximately 1 microsecond characterized by a conversion efficiency of electrical energy into broadband light of between 15 and 20%. However, only a small fraction of this light can be effectively absorbed by the dye medium to energize the lasing transition. A great majority of the pumping light does not contribute to the laser output and serves mainly to heat the dye solution which gives rise to thermal optic distortions which terminate the laser emission sooner than would otherwise be the case. Thus, the present invention has the advantage of improving the laser quality in addition to improving the system efficiency.

Figure 2:
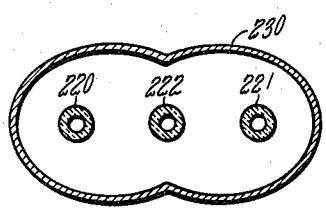
FIG. 2 illustrates in cross section an alternative embodiment of the invention having two light sources.

FIG. 2 illustrates in cross section an improved embodiment of the invention in which two excimer discharge tubes 221 and 220 bracket dye laser 222, the whole being surrounded by reflective electrode 230 which has two elliptical sections having foci located at the positions of the flashlamps and the dye laser.

Figure 3:
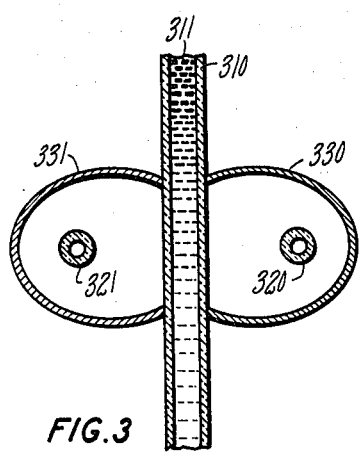
FIG. 3 illustrates in cross section an alternative embodiment of the invention.

FIG. 3 illustrates in cross section an embodiment of the invention having superior ability to flow the dye medium rapidly, in which flashlamps 320 and 321 surrounded by reflector electrodes 330 and 331, respectively, direct light through glass plates 310 which are oriented perpendicular to the plane of the paper. Rapid flow of the dye medium allows operation of the laser at higher repetition rates. Dye laser medium 311 flows between glass plates 310 upwards or downwards in the figure. The length of glass plates 310 and thus of the dye gain medium perpendicular to the paper is the same as the length of flash tubes 320 and 321, illustratively 20 centimeters. The shape of electrodes 330, 331 and 230 may be elliptical in order to provide for better focusing of the light.

Figure 4:
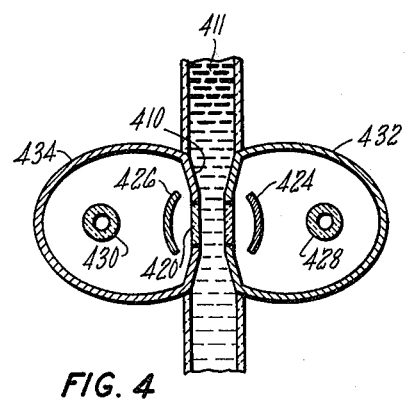
FIG. 4 illustrates in cross section an alternative embodiment of the invention.

FIG. 4 illustrates an improved embodiment of the invention having greater light concentration, in which flashlamp tubes 428 and 430 surrounded by reflective electrodes 432 and 434, respectively, direct light through lenses 424 and 426, respectively, which lenses focus the light and direct it through windows 420, thereby producing greater pumping light intensity. Windows 420 are set into walls 410 which are similar to walls 310 of the embodiment of FIG. 3. Dye gain medium 411 flows through walls 410 as in the previous embodiment.

We claim:

1. A dye laser system comprising:
   a dye gain medium;
   means for resonating optical radiation in said gain medium; and
   means for optically pumping said gain medium, characterized in that;
   said means for optically pumping said gain medium includes a capillary flash tube containing an excimer gas mixture;
   means for generating an electrical lamp pulse; and
   means for capacitively coupling said lamp pulse through said excimer gas mixture.

2. A dye laser system according to claim 1, in which said means for capacitively coupling said lamp pulse includes an electrode having a reflective surface and being disposed along a first side of said flash tube opposite said gain medium for coupling electrical energy into said excimer gas mixture and directing light from said flash tube toward said gain medium.

3. A dye laser system according to claim 2, in which said excimer gas mixture is formed from at least two constituent gases that combine, under the influence of an electric discharge, to form an excimer that radiates in a band of less than 60 nanometers centered on a wavelength of less than 500 nanometers.

* * * * *